(12) United States Patent
Fuerhapter

(10) Patent No.: US 6,948,309 B2
(45) Date of Patent: Sep. 27, 2005

(54) METHOD OF OPERATING AN INTERNAL COMBUSTION ENGINE

(75) Inventor: Alois Fuerhapter, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/437,441

(22) Filed: May 14, 2003

(65) Prior Publication Data

US 2004/0079323 A1 Apr. 29, 2004

(30) Foreign Application Priority Data

May 17, 2002 (AT) .................................. GM319/2002

(51) Int. Cl.⁷ ................................................ F01N 3/00
(52) U.S. Cl. ..................... 60/278; 60/274; 60/285; 60/302; 123/568.11; 123/568.19; 123/568.33
(58) Field of Search .................. 60/274, 278, 285, 60/302; 123/568.11, 568.19, 568.31

(56) References Cited

U.S. PATENT DOCUMENTS

| | | | |
|---|---|---|---|
| 6,116,208 A | | 9/2000 | Nishimura et al. |
| 6,131,388 A | * | 10/2000 | Sasaki et al. ................ 60/286 |
| 6,152,118 A | * | 11/2000 | Sasaki et al. .......... 123/568.21 |
| 6,340,014 B1 | * | 1/2002 | Tomita et al. .............. 123/295 |
| 6,560,960 B2 | * | 5/2003 | Nishimura et al. ........... 60/284 |
| 6,625,974 B1 | * | 9/2003 | Herynek ...................... 60/278 |

FOREIGN PATENT DOCUMENTS

| | | |
|---|---|---|
| AT | 003135 | 10/1999 |
| AT | 005140 | 3/2002 |
| DE | 3601703 | 7/1987 |
| DE | 4038169 | 6/1992 |
| DE | 4322526 | 1/1995 |
| EP | 0943793 | 9/1999 |
| EP | 1063427 | 12/2000 |
| JP | 2000320360 | 11/2000 |

* cited by examiner

Primary Examiner—Binh Q. Tran
(74) Attorney, Agent, or Firm—Dykema Gossett PLLC

(57) ABSTRACT

The invention relates to a method of operating an internal combustion engine having at least one mode of operation in which combustion substantially relies on autoignition of a compression ignitable homogeneous fuel/air mixture, more specifically of a gasoline/air mixture, the temperature in the combustion chamber being controlled by exhaust gas recirculation. To increase the charge temperature in the combustion chamber in the simplest possible manner, there is provided that the residual gases be recirculated through at least one catalyst disposed in the exhaust duct in proximity to the engine.

1 Claim, 1 Drawing Sheet

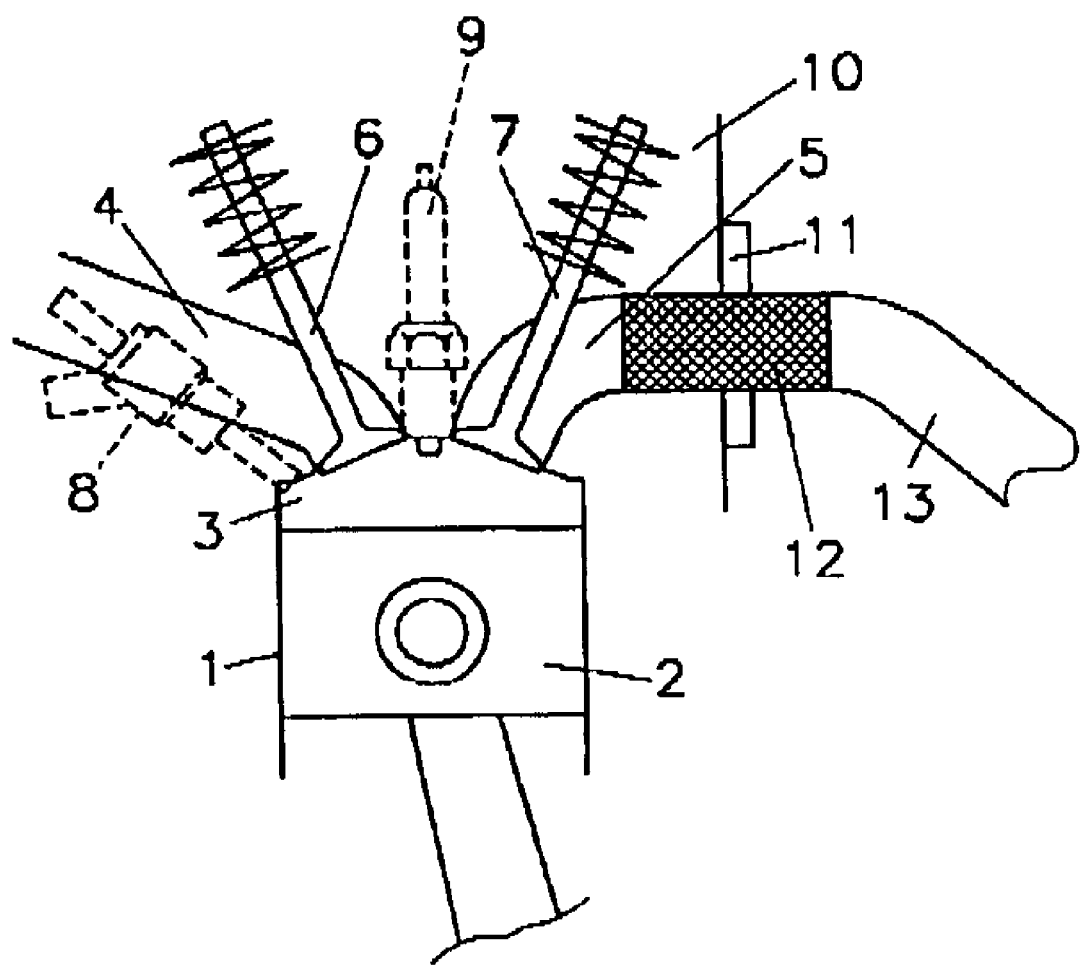

METHOD OF OPERATING AN INTERNAL COMBUSTION ENGINE

BACKGROUND OF THE INVENTION

The invention relates to a method of operating an internal combustion engine having at least one mode of operation in which combustion substantially relies on autoignition of a compression ignitable homogeneous fuel/air mixture, more specifically of a gasoline/air mixture, the temperature in the combustion chamber being controlled by exhaust gas recirculation.

The major elements determining the combustion process in an internal combustion engine are the phase position of the combustion process, or rather of the start of combustion, the maximum rate of cylinder pressure rise and the peak pressure point.

In an internal combustion engine in which combustion substantially relies on autoignition of a compression ignitable homogeneous fuel/air mixture, these elements are determined by controlling the charge composition and the charge temperature history. These two values are in turn determined by a great number of influencing variables such as engine speed, fuel quantity, boost pressure, effective compression ratio, inert gas content of the cylinder charge and temperature of the component parts.

It has been found that the charge temperature plays a particularly important part in controlling the speed of the chemical processes taking place during the ignition delay period and during the very combustion. A very efficient means of increasing the charge temperature is to increase the residual gas content, meaning to increase the amount of not expelled, recirculated exhaust gases of the previous combustion cycle contained in the cylinder charge and intended to be used in the next cycle.

DESCRIPTION OF PRIOR ART

The document AT 005140 U1 discloses a method of operating an internal combustion engine relying for operation on a compression ignitable, homogeneous fuel/air mixture in which the charge temperature profile is adjusted by controlling the residual gas content in the combustion chamber.

The document AT 003135 U1 describes an internal combustion engine that burns, in at least one mode of operation, a homogeneous fuel/air mixture by compression ignition of a both spark-ignitable and compression ignitable fuel, more specifically gasoline. As a result thereof, during engine part load conditions, particularly low emission operation can be achieved. In order to enable the quantity of residual gases to be controlled to the effect of internal exhaust gas recirculation for increasing the charge temperature during engine part load conditions, the time for closing of at least one exhaust valve is varied as a function of engine operating parameters using a variable valve timing control unit.

It has been found though that it is very difficult to achieve the combustion chamber temperatures required to ensure compression ignition of gas without taking further measures.

Internal combustion engines having catalysts mounted near the engine are disclosed in the publications DE 36 01 703 A1, DE 40 38 169 C2 and DE 43 22 526 C2. To install the catalyst in proximity to the engine permits to keep said catalyst on the temperature level required for orderly operation. No provisions are made for increasing the temperature of the charge in the combustion chamber by recirculating the residual gases through the catalyst.

JP 2000-320360 A discloses an exhaust emission control apparatus for an internal combustion engine with an $NO_x$ catalyst in the exhaust flow, a recirculating exhaust gas duct branching off downstream of the catalyst and leading to the intake system.

EP 1 063 427 A2 describes an internal combustion engine with an operational range relying on compression ignition of a homogeneous fuel/air mixture, said engine having a catalyst in the exhaust flow. Upstream of the catalyst, a recirculating exhaust gas duct branches off and leads to the intake system.

EP 0 943 793 A2 discloses an internal combustion engine with direct injection and spark ignition of a stratified fuel/air mixture within a homogeneous lean basic mixture in the combustion chamber. Upstream of a catalyst in the exhaust flow, a recirculating exhaust gas duct branches off and leads to the intake system. A similar internal combustion engine is known from U.S. Pat. No. 6,116,208.

SUMMARY OF THE INVENTION

It is the object of the invention to ensure in the simplest possible manner reliable compression ignition of an autoignitable homogeneous fuel/air mixture, more specifically of a gasoline/air mixture, in an internal combustion engine relying for operation on the homogeneous charge compression ignition mode.

In accordance with the invention, this is achieved in recirculating the residual gases through at least one catalyst disposed in the exhaust duct in proximity to the engine. Through the catalytic conversion of the unburned hydrocarbons in the exhaust gases, the temperature of the residual gases is increased in an exothermic reaction before said residual gases are recirculated into the combustion chamber. To heat the charge in the combustion chamber it is particularly advantageous to lead the exhaust gases through the catalyst both during the exhaust period and during exhaust gas recirculation, the exhaust gases flowing through the catalyst in a direction which is directed toward the outlet during the exhaust period and in an opposite direction during recirculation of the exhaust. The unburned hydrocarbons in the exhaust are thus catalytically converted before the exhaust gases are recirculated.

To implement the method in accordance with the invention, a metal carrier catalyst is welded into the flange of the exhaust elbow for each cylinder in such a manner that said catalyst projects, on the side of the cylinder head, into the exhaust duct where it extends to end in front of the exhaust valves. Alternatively, there may be provided that the catalyst be incorporated in the exhaust duct. It is thus made certain that the greatest possible amount of exhaust is forced through said catalyst during the exhaust period and that it is drawn back through said catalyst during the subsequent intake period. The thus generated internal residual gas is hotter since the unburned fraction is converted into heat as the exhaust is being forced back and forth. The more exhaust gas is being recirculated and the higher the amount of unburned hydrocarbons contained in said exhaust gas the higher the increase in temperature will be.

Another advantage is that a fast warm-up time can be achieved due to the extremely close proximity of the catalyst to the cylinder so that the warm-up period can also be shortened.

BRIEF DESCRIPTION OF THE DRAWING

The invention will be explained in closer detail herein after with reference to the drawing.

The FIGURE is a schematical sectional view of a cylinder 1 of an internal combustion engine with a reciprocating piston 2 and a combustion chamber 3 into which at least one intake duct 4 discharges and from which at least one exhaust duct 5 takes departure. The intake duct 4 is controlled by at least one intake valve 6, the exhaust duct 5 by at least one exhaust valve 7. An injection valve 8 is provided for direct fuel injection into the combustion chamber 3.

DETAILED DESCRIPTION OF THE PREFERRED EMBODIMENT

At least during engine part load conditions, the internal combustion engine utilizes for operation an HCCI combustion strategy (Homogeneous Charge Compression Ignition). A homogeneous fuel/air mixture thereby autoignites within the combustion chamber 3, the ignition timing being controlled by influencing the charge temperature. The homogeneous fuel/air mixture can be obtained by either the mixture being drawn through the intake duct, for example through indirect fuel injection into the intake duct 4, or, in the event of direct injection, through the injection valve 8, which is achieved by injecting the mixture into the combustion chamber 3 at an accordingly early stage.

An optional spark plug is indicated at 9. It is utilized when the internal combustion engine functions in a spark ignited mode in certain operational conditions such as at full load or at a cold start.

To influence the temperature of the charge in the combustion chamber 3, the internal combustion engine comprises a residual gas recirculating apparatus (not shown) that causes, in the intake period, the residual gases to be recirculated from the exhaust duct 5 into the combustion chamber 3 by influencing the timing of the exhaust valve 7.

To permit to achieve a sufficiently high enough charge temperature in the combustion chamber 3, a catalyst 12 is provided in the exhaust duct 5 of the cylinder head 10 in close proximity to the engine. For this purpose, a metal carrier catalyst is welded for each cylinder 1 into the flange 11 of the exhaust elbow 13 in such a manner that it projects, on the side of the cylinder head, into the exhaust duct 5 where it extends to end in front of the exhaust valve 7. It is thus made certain that the greatest possible amount of exhaust gas is forced through said catalyst 12 during the exhaust period and drawn back through the same during the subsequent intake period. The thus produced internal residual gas is hotter since the unburned fraction is converted into heat as the exhaust is being forced back and forth.

Alternatively, the catalyst 12 may be incorporated in the exhaust duct 5 on the side of the cylinder head 10.

What is claimed is:

1. A method of operating an internal combustion engine having at least one mode of operation in which combustion substantially relies on autoignition of a compression ignitable homogenous fuel/air mixture, more specifically of a gasoline/air mixture, the temperature in a combustion chamber being controlled by recirculation of exhaust gases from an exhaust duct, wherein the exhaust gases are recirculated through at least one catalyst disposed in the exhaust duct in proximity to the engine and wherein the exhaust gases are led through the catalyst both during an exhaust period and during exhaust gas recirculation, the exhaust gases flowing through the catalyst in a direction which is directed toward an outlet during an exhaust period and in an opposite direction during recirculation of the exhaust gases.

* * * * *